United States Patent Office 2,693,489
Patented Nov. 2, 1954

2,693,489
α,β-DISULFOALKYL CARBINOLS

Roger F. Kleinschmidt, Belvidere, N. J., assignor to General Aniline & Film Corporation, New York, N. Y., a corporation of Delaware No Drawing. Application March 5, 1952,
Serial No. 275,019

1 Claim. (Cl. 260—513)

This invention relates to α,β-disulfoalkyl carbinols.

It is an object of the present invention to provide α,β-disulfoalkyl carbinols which are useful as intermediates in the preparation of surface active agents.

Other objects and advantages will be apparent from the following specification in which the preferred details and embodiments are described.

The compounds of this invention are characterized by a structure corresponding to the general formula:

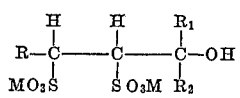

wherein R represents either hydrogen or an alkyl radical of not more than 4 carbon atoms, e. g., methyl, ethyl, propyl or butyl, or a phenyl radical, and $R_1$ and $R_2$ represent either hydrogen or an alkyl radical of not more than 4 carbon atoms of the same value as R, and M represents an alkali metal ion such as lithium, sodium or potassium or an ammonium ion.

The compounds illustrated by the foregoing general formula are readily obtained by either heating at reflux for 3 to 4 hours an aqueous solution of two chemical equivalents of either ammonium, lithium, sodium, or potassium bisulfite with a theoretical or chemical equivalent of a substituted or unsubstituted 2-propyn-1-ol or by heating the coreactants at a temperature ranging from 100–175° C. and a pressure ranging from normal, slightly above normal, to 50 to 150 lbs. p. s. i. A clear solution results and the solid product is isolated by concentration and removal of the last traces of water with water-miscible solvents, such as acetone, absolute lower alcohol, or mixtures thereof. The isolation of the solid bisulfite product while employing 2-propyn-1-ols is quite difficult if not impossible at times. When the reaction mixture is concentrated by the usual means a viscous syrup is obtained which shows no signs of crystallization. In order to overcome these difficulties, I have found that by triturating small amounts of the syrup with acetone or a lower absolute alcohol, such as methyl, ethyl, or isopropyl alcohol, in a Waring Blender, a dry solid is obtained.

In the event the substituted or unsubstituted 2-propyn-1-ol is slightly soluble in water, the reaction may be conducted in a media of water and a lower alkyl alcohol, such as ethanol, isopropanol and the like, which will effect increased solubility of the less soluble substituted propynols. In such case, where a lower alkyl alcohol is utilized as a portion of the solvent media, the temperature of reaction may range from 100–175° C. while employing elevated pressures, i. e., ranging from 50 to 300 lbs. p. s. i.

The substituted and unsubstituted 2-propyn-1-ols are readily obtained by reacting acetylene itself or its alkyl and aryl homologues with an aliphatic aldehyde or ketone according to the process steps described by Reppe et al. in United States Patent 2,232,867 and the related German patents referred to on pages 39 et seq. of "Naturforschung und Medizin in Deutschland" 1939–1946, Band 36, Preparative Organische Chemie, Teil 1, by Karl Ziegler, published by Dieterich sche Verlogsbuchhandlung Inhaber W. Klemm, Wiesbaden, Germany (P. B. Report 99207).

For the purpose of the present invention, I prefer to employ 2-propyn-1-ols which are obtained by reacting the following acetylene compounds, aldehydes, and ketones:

Acetylenic compounds (1) CH≡CH
Acetylene (2) CH₃C≡CH
Methylacetylene (3) CH₃CH₂C≡CH
Ethylacetylene (1-butine)

(4) CH₃CH₂CH₂C≡CH
1-pentine (5) C₆H₅C≡CH
Phenylacetylene

Aldehydes (1) HCHO
Formaldehyde (2) CH₃CHO
Acetaldehyde (3) CH₃CH₂CHO
Propionaldehyde (4) CH₃CH₂CH₂CHO
Butyraldehyde (5) (CH₃)₂CHCHO
Isobutyraldehyde (6) CH₃(CH₂)₃CHO
Valeraldehyde (7) (CH₃)₂CHCH₂CHO
Isovaleraldehyde

Ketones (1) CH₃COCH₃
Acetone (2) CH₃CH₂COCH₃
Ethyl methyl ketone (3) CH₃CH₂COCH₂CH₃
Diethyl ketone (4) CH₃COCH₂CH₂CH₃
Methyl propyl ketone (5) (CH₃)₂CHCOCH₃
Isopropyl methyl ketone As illustrative 2-propyn-1-ols which have been prepared from the foregoing coreactants by following the process steps of Reppe et al. and utilized in the preparation of surface active agents, the following may be mentioned:

(1) HC≡C—CH₂OH
2-propyn-1-ol (2) HC≡C—CH—CH₃
         |
         OH
3-butyn-2-ol (3) CH₃C≡C—CH₂OH
2-butyn-1-ol (4) CH₃CH₂C≡C—CH₂OH
2-pentyn-1-ol (5) HC≡C—CHCH₂CH₃
         |
         OH
4-pentyl-3-ol (6) CH₃C≡C—CH—CH₃
         |
         OH
3-pentyn-2-ol (7)        CH₃
            |
   CH≡C—C—CH₃
            |
            OH
2-methyl-3-butyn-2-ol (8) CH₃CH₂CH₂C≡C—CH₂OH
2-hexyn-1-ol (9) CH₃CH₂C≡C—CHCH₃
         |
         OH
3-hexyn-2-ol

(10) CH₃C≡C—CHCH₂CH₃
           |
           OH
4-hexyn-3-ol

(11) HC≡C—CHCH₂CH₂CH₃
         |
         OH
1-hexyn-3-ol

(12) 
          CH₃
          |
CH₃C≡C—C—CH₃
          |
          OH
2-methyl-3-pentyn-2-ol

(13) 
         CH₃
         |
HC≡C—C—CH₂CH₃
         |
         OH
3-methyl-1-pentyn-3-ol

(14) 
         CH₂CH₃
         |
HC≡C—C—CH₂CH₃
         |
         OH
3-ethyl-1-pentyn-3-ol (15)

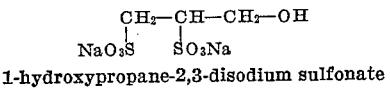

3-phenyl-2-propyn-1-ol

(16) 
          C≡C—CHCH₃
                  |
                  OH
4-phenyl-3-butyn-2-ol

(17) 
              CH₃
              |
   C≡C—C—CH₃
              |
              OH
2-methyl-4-phenyl-3-butyn-2-ol The following examples illustrate the preparation of the novel compounds of the present invention. All the parts are by weight.

Example I

CH₂—CH—CH₂—OH
  |        |
NaO₃S   SO₃Na 1-hydroxypropane-2,3-disodium sulfonate A mixture of 104 parts of sodium bisulfite in 150 parts of water was treated with 28 parts of propargyl alcohol and the reaction mixture heated at gentle reflux for 3 to 4 hours. The hot reaction mixture was then treated with decolorizing carbon and filtered. The pale brown filtrate was concentrated in vacuo to a tan, viscous syrup. The addition of small quantities of this syrup to large quantities of acetone or absolute alcohol with vigorous stirring in a Waring Blender yielded a finely divided light tan solid. Two successive treatments with fresh solvent insured a dry product which was not very hygroscopic.

Example II

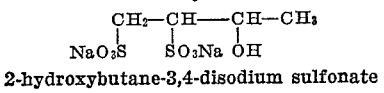

2-hydroxybutane-3,4-disodium sulfonate

Example I was repeated with the exception that 28 parts of propargyl alcohol were replaced by 35 parts of 3-butyn-2-ol.

Example III

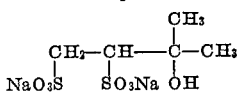

2-hydroxy-2-methylbutane-3,4-disodium sulfonate

Example I was repeated with the exception that 28 parts of propargyl alcohol were replaced by 42 parts of 2-methyl-3-butyn-2-ol.

Example IV

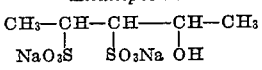

2-hydroxypentane-3,4-disodium sulfonate

Example I was repeated with the exception that 28 parts of propargyl alcohol were replaced by 42 parts of 3-pentyn-2-ol.

Example V

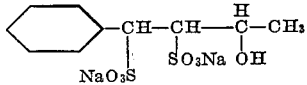

2-hydroxy-4-phenylbutane-3,4-disodium sulfonate

The procedure of Example I was repeated with the exception that 28 parts of propargyl alcohol were replaced by 73 parts of 4-phenyl-3-butyn-2-ol.

All of the foregoing 1-hydroxy-2,3-propane derivatives are particularly valuable in the preparation of surface active agents. The alcohol group can be esterified with long chain aliphatic acid chlorides to give surface active agents possessing desirable wetting properties. Due to their great affinity for water, the 1-hydroxy-2,3-propane alkali metal and ammonium disulfonates are extremely valuable in the stabilization of other organic compounds of limited solubility.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the following claim.

I claim:

2-hydroxy-2-methylbutane-3,4-disodium sulfonate having the following formula:

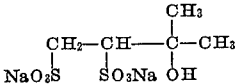

References Cited in the file of this patent

FOREIGN PATENTS

| Number | Country | Date |
|---|---|---|
| 702,732 | Germany | Feb. 14, 1941 |

OTHER REFERENCES

Beilstein, vol. 4, page 16.
Beilstein, Second Suppl., vol. 4, page 530.
Nottbohm, Annalen, vol. 412, pages 50 and 54.